United States Patent
Kattainen et al.

(10) Patent No.: US 11,124,383 B2
(45) Date of Patent: Sep. 21, 2021

(54) METHOD FOR CONTROLLING AN ELEVATOR LIGHTING AND AN ELEVATOR

(71) Applicant: KONE Corporation, Helsinki (FI)

(72) Inventors: Ari Kattainen, Helsinki (FI); Gareth Chapman, Helsinki (FI); Jari Kantola, Helsinki (FI); Juha-Matti Aitamurto, Helsinki (FI); Jukka Lindberg, Helsinki (FI); Pekka Laukkanen, Helsinki (FI); Sivasamy Manokar, Helsinki (FI)

(73) Assignee: KONE CORPORATION, Helsinki (FI)

( * ) Notice: Subject to any disclaimer, the term of this patent is extended or adjusted under 35 U.S.C. 154(b) by 753 days.

(21) Appl. No.: 15/969,545

(22) Filed: May 2, 2018

(65) Prior Publication Data
US 2018/0339880 A1    Nov. 29, 2018

(30) Foreign Application Priority Data
May 29, 2017   (EP) ..................... 17173208

(51) Int. Cl.
*B66B 5/00* (2006.01)
*B66B 11/02* (2006.01)
*B66B 11/00* (2006.01)

(52) U.S. Cl.
CPC ........ *B66B 5/0087* (2013.01); *B66B 11/0005* (2013.01); *B66B 11/0233* (2013.01)

(58) Field of Classification Search
CPC ............... B66B 5/0087; B66B 11/0005; B66B 11/0233
See application file for complete search history.

(56) References Cited

U.S. PATENT DOCUMENTS

| | | | |
|---|---|---|---|
| 2006/0070823 A1* | 4/2006 | Huang | B66B 11/024 187/401 |
| 2010/0061076 A1* | 3/2010 | Mandy | F21V 19/001 362/20 |
| 2012/0181117 A1* | 7/2012 | Chasteen | B66B 11/0233 187/392 |
| 2014/0216856 A1* | 8/2014 | Hovi | B66B 5/005 187/314 |
| 2017/0137256 A1* | 5/2017 | Meguro | B66B 5/005 |
| 2018/0273344 A1* | 9/2018 | Mason | G08B 25/08 |
| 2018/0370763 A1* | 12/2018 | Kusserow | B66B 5/005 |
| 2019/0084796 A1* | 3/2019 | Buckley | B66B 5/0056 |
| 2019/0092601 A1* | 3/2019 | Tegtmeier | B66B 5/005 |
| 2019/0367324 A1* | 12/2019 | Kim | B01D 46/0036 |

FOREIGN PATENT DOCUMENTS

| | | |
|---|---|---|
| EP | 1 281 654 A1 | 2/2003 |
| JP | 2004-189365 A | 7/2004 |
| JP | 2010-159154 A | 7/2010 |
| JP | 2017-30955 A | 2/2017 |

* cited by examiner

Primary Examiner — Jeffrey Donels
(74) Attorney, Agent, or Firm — Birch, Stewart, Kolasch & Birch, LLP

(57) ABSTRACT

The elevator comprising a car moving upwards and downwards in a well, a controller controlling the elevator, and a well lighting. The method comprises detecting a manual unlocking or a manual opening of a landing door, activating the well lighting automatically when the controller detects a manual unlocking or a manual opening of a landing door.

18 Claims, 3 Drawing Sheets

METHOD FOR CONTROLLING AN ELEVATOR LIGHTING AND AN ELEVATOR

FIELD

Figure 1:
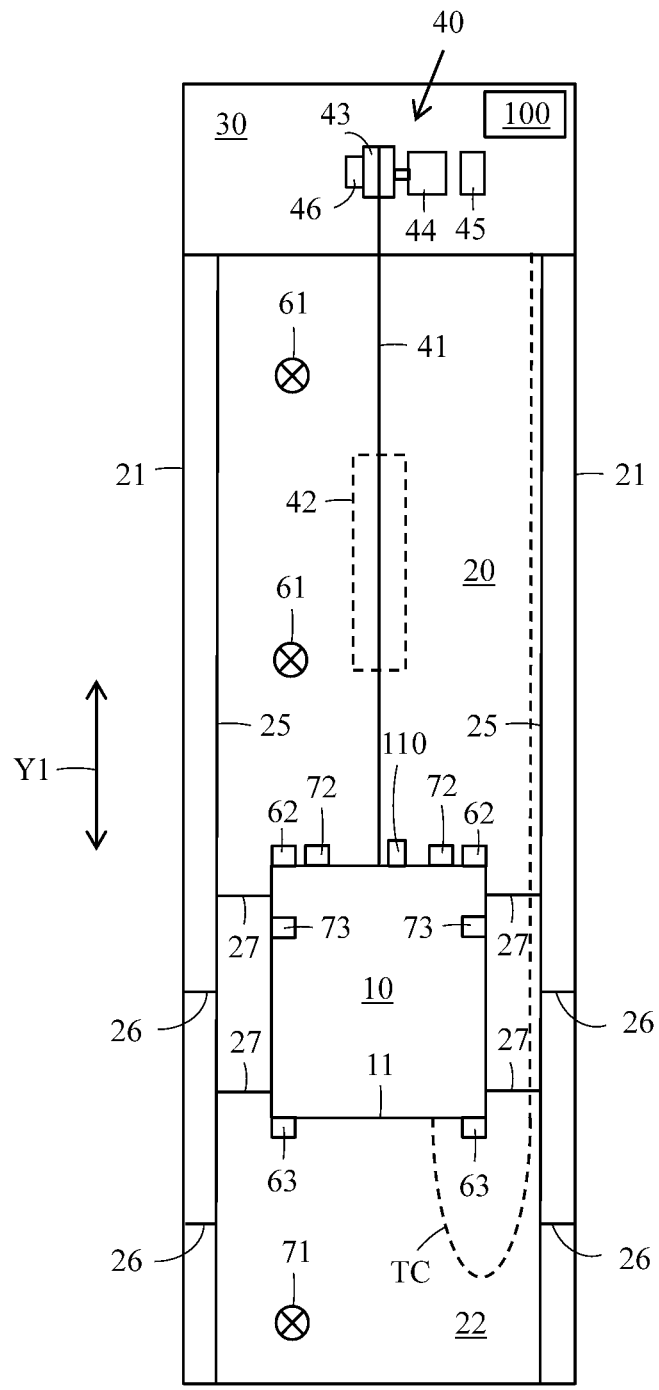

The invention relates to a method for controlling an elevator lighting and to an elevator.

BACKGROUND

An elevator comprises typically a car, an elevator well, a machine room, lifting machinery, ropes, and a counter weight. The elevator car is positioned within a car frame that supports the car. The lifting machinery may comprise a sheave, a machinery brake and an electric motor for rotating the sheave. The lifting machinery may move the car in a vertical direction upwards and downwards in the vertically extending elevator well. The ropes may connect the car frame and thereby also the car via the sheave to the counter weight. The car frame may further be supported with gliding means on guide rails extending in the vertical direction in the well. The gliding means may comprise rolls rolling on the guide rails or gliding shoes gliding on the guide rails when the elevator car is mowing upwards and downwards in the well. The guide rails may be supported with fastening brackets on the side wall structures of the well. The gliding means engaging with the guide rails keep the car in position in the horizontal plane when the car moves upwards and downwards in the well. The counter weight may be supported in a corresponding way on guide rails supported on the wall structure of the well. The elevator car may transport people and/or goods between the landings in the building. The well may be formed of solid walls and/or of open steel structures.

The well may be provided with well lighting to be used when a service technician is entering the well and/or is within the well. The control panel of the elevator may be provided with an impulse relay through which power to the well lighting may be supplied. The operational state of the impulse relay can be changed manually by using a button in the control panel or a button in the well pit. Activation of the well lighting is thus possible only manually from the control panel or from the well pit. The service technician should thus first visit the control panel or the well pit in order to manually turn on the well lighting before he enters into the well from a landing door. This is cumbersome and there is therefore a clear risk that the service technician will enter the well directly from a landing without first visiting the control panel or the well pit in order to turn on the well lighting. This is especially the case in a situation where the service technician may enter the well in order to climb on the top of the car from any landing except the lowermost landing. The distance to the control panel or to the well pit might be great from the landing from which the service technician intends to enter into the well.

The darkness in the well may cause problems for a service technician to detect the position of the car in the well when he opens the landing doors. The service technician may assume that the car is right below the landing door and he might not notice that this is not the actual case due to the darkness in the well. The car might for some reason be above the landing or far below the landing.

There is also a risk that the service technician leaving the well from the top of the car might not remember to visit the controller area or the well pit in order to turn off the well lighting. The well lighting might thus be left on resulting in increased energy consumption and shortened life time of the lamps of the well lighting.

EP patent application 2 765 108 discloses a method for providing well access in an elevator. Activation of a well access mode according to the EP patent application will make it possible for a service technician to enter the well from any landing except the lowermost landing in order to climb on the roof of the car.

SUMMARY

An object of the present invention is to achieve an improved method for controlling an elevator lighting and an improved elevator.

A method for controlling an elevator lighting is defined in the claims.

A method for controlling an elevator lighting, said elevator comprising a car moving upwards and downwards in a well, a controller controlling the elevator, and a well lighting, the method comprising:

detecting a manual unlocking or a manual opening of a landing door, activating the well lighting automatically when the controller detects a manual unlocking of a landing door or a manual opening of a landing door.

An elevator comprising a car moving upwards and downwards in a well, a controller controlling the elevator, and a well lighting being supplied with electric power from a power supply for well lighting, the well lighting being controlled by the controller, whereby a manual unlocking or a manual opening of a landing door is detected by the controller, the well lighting is activated automatically by the controller when the controller detects a manual unlocking or a manual opening of a landing door.

An automatic activation (turning on) of the well lighting when a manual unlocking or a manual opening of a landing door is detected indicating that a service technician is about to enter the well from a landing will increase the safety of the elevator. The well will be illuminated when the service technician enters the well making it possible for the service technician to locate the position of the car in the well in a safe way.

The well lighting may comprise a stationary well lighting mounted on at least one wall of the well.

The well lighting may further comprise a first movable well lighting in the form of a top of car well lighting mounted on a top of the car and/or a second movable well lighting in the form of a bottom of car well lighting mounted at a bottom of the car. The top of car well lighting and/or the bottom of car well lighting may be operated in synchronism with the stationary well lighting. The top of car well lighting and/or the bottom of car well lighting is directed from the car towards the well. The car lighting increases the safety further as the car lighting makes it still easier for the service technician entering the well from a landing to safely observe the position of the car in the well.

The invention may further comprise an automatic deactivation (turning off) of the well lighting when a service technician leaves the well from a landing. An automatic deactivation of the well lighting will eliminate the risk of forgetting the well lighting on.

DRAWINGS

Figure 2:
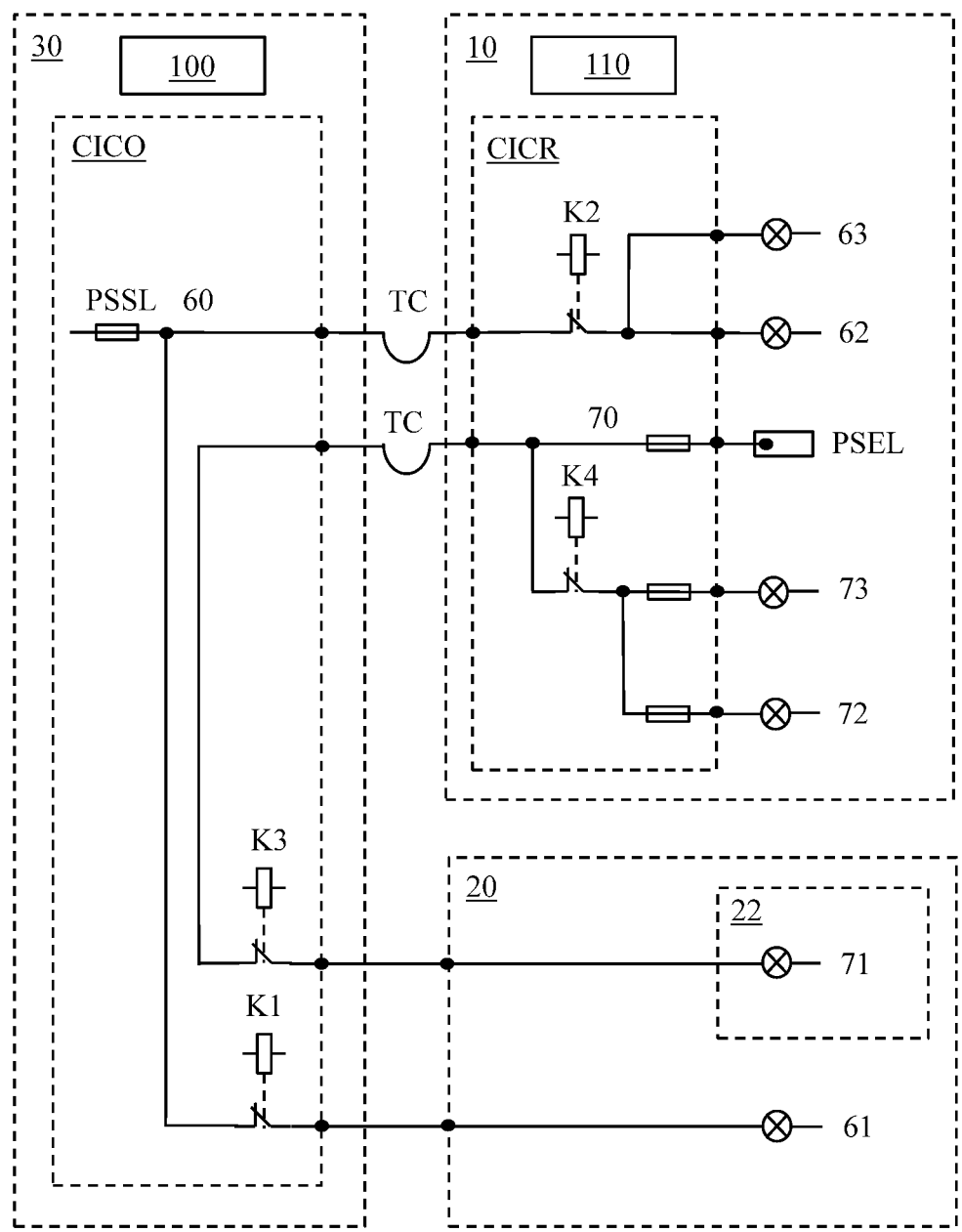
Figure 3:
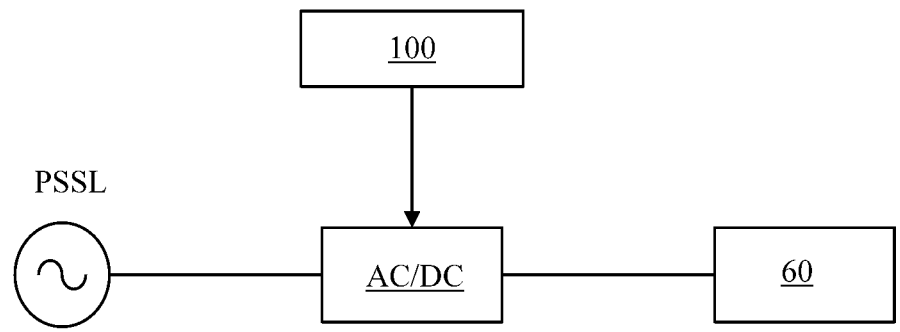
Figure 3:
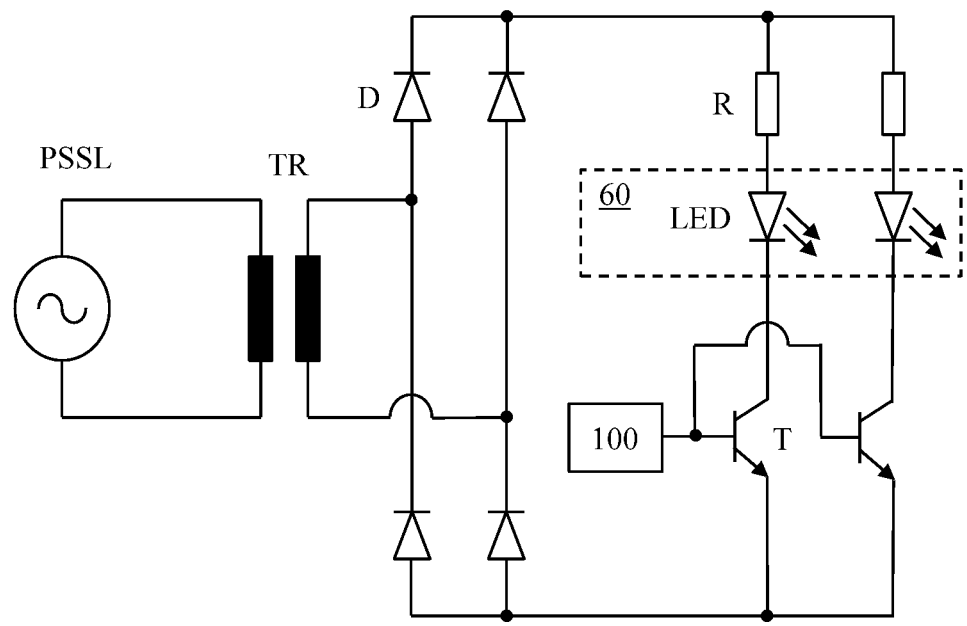
Figure 4:
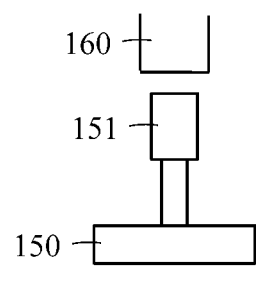
Figure 5:
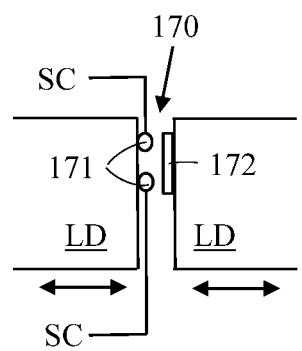

The invention will in the following be described in greater detail by means of preferred embodiments with reference to the attached drawings, in which FIG. 1 shows a first vertical cross section of an elevator, FIG. 2 shows a first embodiment of a control system for an elevator well lighting, FIG. 3 shows a second embodiment of a control system for an elevator well lighting, FIG. 4 shows a service key and a service key nest, FIG. 5 shows a switching device in a landing door.

DETAILED DESCRIPTION

FIG. 1 shows a vertical cross section of an elevator. The elevator comprises a car 10, a well 20, a machine room 30, lifting machinery 40, ropes 41, and a counter weight 42. A car frame 11 surrounds the car 10. The car frame 11 may be a separate frame or formed as an integral part of the car 10. The lifting machinery 40 may comprise a sheave 43, a machinery brake 46, an electric motor 44 and a drive 45. The drive 45 may be a frequency converter controlling the electric motor 44. The sheave 43 is connected to the shaft of the electric motor 44. The lifting machinery 40 may move the car 10 in a vertical direction Y1 upwards and downwards in the vertically extending elevator well 20. The car frame 11 may be connected by the ropes 41 via the sheave 43 to the counter weight 42. The car frame 11 may further be supported with gliding means 27 at guide rails 25 extending in the vertical direction in the well 20. The figure shows two guide rails 25 at opposite sides of the car 10. The gliding means 27 may comprise rolls rolling on the guide rails 25 or gliding shoes gliding on the guide rails 25 when the car 10 is mowing upwards and downwards in the well 20. The guide rails 25 may be attached with fastening brackets 26 to the side wall structures 21 in the well 20. The figure shows only two fastening brackets 26, but there are several fastening brackets 26 along the height of each guide rail 25. The gliding means 27 engaging with the guide rails 25 keep the car 10 in position in the horizontal plane when the car 10 moves upwards and downwards in the well 20. The counter weight 42 is supported in a corresponding way on guide rails that are attached to the wall structure 21 of the well 20. The machinery brake 46 stops the rotation of the sheave 43 and thereby the movement of the elevator car 10. The car 10 may transport people and/or goods between the landings in the building. The well 20 may be formed so that the wall structure 21 is formed of solid walls or so that the wall structure 21 is formed of an open steel structure. The well pit 22 is formed at the bottom of the well 20 below the first landing in the well 20. A controller 100 may be used to control the elevator. A sub-controller 110 may be used to control the car 10. The controller 100 controls the sub-controller 40.

The elevator may be provided with a well lighting 60. The well lighting 60 may comprise a stationary well lighting 61 mounted on at least one wall in the shaft 20. The stationary well lighting 61 may comprise lamps mounted at suitable intervals along the height of the well 20. The well lighting 60 may further comprise a movable well lighting 62, 63. The car 10 may be provided with a first movable well lighting 62 in the form of a top of car well lighting 62. The car 10 may further be provided with a second movable well lighting 63 in the form of a bottom of car well lighting 63. The top of car well lighting 62 and the bottom of car well lighting 63 may be directed from the car 10 towards the well 20 in order to illuminate the well 20 in the vicinity of the car 10. The amount of the stationary well lighting 61 may be slightly reduced when the car 10 is provided with top of car lighting 62 and/or bottom of car lighting 63.

The elevator may further be provided with an emergency lighting 70. The emergency lighting 70 may comprise a well pit emergency lighting 71 mounted in the well pit 22. The emergency lighting 70 may further comprise a top of car emergency lighting 72 and an in car emergency lighting 73.

The lamps in the well lighting 60 as well as the lamps in the emergency lighting 70 may be of any kind e.g. LED lamps.

A travelling cable TC may pass from the car 10 to the controller 100 being located in the machine room 30 or in any other position in the well 20. The travelling cable TC connects the car 10 and the controller 100.

The use of the invention is not in any way limited to the type of elevator disclosed in FIG. 1. The invention can be used in any type of elevator e.g. also in elevators lacking a machine room and/or a counterweight. The counterweight could be positioned on either side wall or on both side walls or on the back wall of the elevator well. The hoisting machinery is positioned in the machine room in the figure, but the hoisting machinery could be positioned anywhere in the elevator well even in the well pit in an elevator lacking a machine room.

An elevator lacking a machine room 30 may be provided with a Maintenance Access Panel (MAP) positioned in a landing door frame on a landing e.g. the uppermost landing. The controller 100 may be positioned in the MAP. The travelling cable TC will thus pass from the car 10 to the MAP.

FIG. 2 shows a first embodiment of a control system for an elevator well lighting.

The figure shows two separate power supplies for lighting in an elevator. The lamps in the well lighting and in the emergency lighting in this first embodiment may be supplied with the AC phase voltage of the main power supply.

The first power supply is a power supply for well lightning PSSL positioned in connection with the machinery area 30 of the elevator. The power supply for well lighting PSSL supplies power to the well lighting 60 i.e. to the stationary well lighting 61 and to the movable well lighting 62, 63. The power supply for well lighting PSSL supplies power via a first relay K1 to the stationary well lighting 61 and via a second relay K2 to the movable well lighting 62, 63 i.e. to the top of car well lighting 62 and to the bottom of car well lighting 63. The first relay K1 may be positioned within the connection interface of the controller CICO and the second relay K2 may be positioned within the connection interface of the car roof CICR. The first relay K1 may be operated by the controller 100 and the second relay K2 may be operated by the sub-controller 110. The controller 100 keeps the contacts in the relays K1, K2 open when the elevator operates in normal operation mode and closes the contacts in the relays K1, K2 when the well lighting is to be turned on.

The second power supply is a power supply for emergency lighting PSEL positioned in connection with the car 10. The power supply for emergency lighting PSEL supplies power to the emergency lighting 70. The power supply for emergency lighting PSEL supplies power via a third relay K3 to the well pit emergency lighting 71 and via a fourth relay K4 to the top of car emergency lighting 72 and to the in car emergency lighting 73. The third relay K3 may be positioned within the connection interface of the controller CICO and the fourth relay K4 may be positioned within the connection interface of the car roof CICR. The third relay K3 may be operated by the controller 100 and the fourth relay K4 may be operated by the sub-controller 110, which is controlled by the controller 100. The sub-controller 110 keeps the contacts in the relays K3, K4 open i.e. keeps the coils activated in the relays K3, K4 when the elevator operates in normal operation mode and closes the contacts in the relays K3, K4 when emergency lighting in the well pit 22 and in the car 10 as well as on the car 10 is to be turned on.

The first relay K1, the second relay K2, the third relay K3 and the fourth relay K4 may all be Normally Closed (NC) relays. This means that one contact or all contacts in the relay are normally closed and open when the relay is activated.

The well lighting 60 and the emergency lighting 70 may be integrated in a way as shown in the figure. The well lighting 60 and the emergency lighting 70 are in spite of the integration formed as electrically separate circuits. This means that there is no electrical mixing between the circuits.

The controller 100 may control the relay K1, K2, K3, K4 via a transistor connected in series with the control coil of the relay K1, K2, K3, K4. The controller 100 controls the base in the transistor so that the transistor is leading or is blocked.

FIG. 3 shows a second embodiment of a control system for an elevator well lighting.

The upper portion of the figure shows a block diagram of the control system and the lower portion of the figure shows a circuit diagram of the control system.

The lamps in the well lighting 60 in this second embodiment may be light emitting diodes i.e. they have to be supplied with a DC voltage. An AC to DC converter is thus needed between the main power supply PSSL and the LED. The power supply may be realized with a transformer TR reducing the main AC phase voltage to a suitable level. The secondary of the transformer TR is connected to the centre of a diode D bridge converting AC to DC. The DC voltage is connected via a resistor R to the LED. A transistor T is further connected in series with the LED. The controller 100 controls the base of the transistor and thereby the LED. The LED is turned on when the transistor T is leading and turned off when the transistor T is blocked.

A relay could in this second embodiment be positioned between the power supply PSSL and the transformer TR, whereby the well lighting 60 could be controlled via the relay in the same way as in the first embodiment.

FIG. 4 shows a service key and a service key nest. The service key 150 has a general form of a letter T with a cylindrical portion 151 at the outer end of the middle branch in the letter T. The outer end of the cylindrical portion 151 comprises a triangular recess, which may be inserted in a corresponding triangular service key nest 160 on a landing. The form locking between the triangular recess in the service key and the triangular protrusion in the service key nest will make it possible to turn a shaft in the service key nest 160. The turning of the shaft in the service nest will open and close a contact in the service chain of the elevator.

FIG. 5 shows a switching device in a landing door. The functional principle of a switching device 170 in the landing doors LD is disclosed in the figure. The switching device 170 may comprise contacts 171 in connection with a first of the landing doors LD and a bridge 172 in connection with an opposite second of the landing doors LD. The contacts 171 are connected into the safety circuit SC of the elevator. The bride 172 will thus close the safety circuit SC when the landing doors are closed and open the safety circuit SC when the landing doors are open. This functional principle can be realized with any switching device being able to form a contact in the safety circuit SC so that the contact opens when the landing doors open and closes when the landing doors close.

FIG. 5 shows a centre opening landing door arrangement comprising two door panels. The landing door is opened when the landing door panels are moved in opposite directions and closed when the landing doors are moved towards each other. This is a common landing door arrangement, but the invention is not limited to this landing door arrangement. The invention may be used in connection with any landing door arrangement based on gliding landing door panels or on turning door panels.

The method for controlling the elevator lighting comprises:

detecting a manual unlocking or a manual opening of a landing door, activating the well lighting 60 automatically when the controller 100 detects a manual unlocking of a landing door or a manual opening of a landing door.

The manual unlocking of the landing door may be done by turning a service key in a service key nest on a landing, which turning of service key is detected by the controller 100. The service key may be a so called triangle key, which may be inserted into a corresponding triangular service key nest on the landing. The service key nest may be positioned in the frame of the landing door at the landing e.g. in the control panel on the landing.

A service technician entering the well 20 from a landing may thus first unlock the landing doors manually with a service key. Opening of the lock of the landing doors manually with the service key may also open the safety circuit of the elevator, whereby normal operation of the elevator is prohibited.

The manual opening of a landing door may be done by a service technician so that he forces the landing doors manually to open in order to be able to enter into the well. The manual opening of the landing doors may trigger a switch, which may be detected by the controller 100. The switch may be a safety switch in the safety chain of the elevator.

The well lighting 60 may be deactivated automatically at the end of a predetermined time period after the controller 100 has determined that the elevator has returned to normal operation.

EP patent application 2 765 108 discloses a method for providing well access in an elevator. A service technician may enter the well from any landing except the lowermost landing in order to climb on the roof of the car in the well access operation mode according to the EP patent application. Activation of the well access operation mode means that the controller 100 of the elevator is set into a special operation mode in which the controller 100 expects that a service technician is going to enter the well from a landing in order to climb on the roof of the car for doing maintenance work in the well. Normal operation of the elevator is prevented in this special operation mode.

In the well access mode, the car is first controlled to travel a set distance up or down and to stop at said distance for a given time. The elevator will automatically exit the well access operating mode and return back to normal service if within the given time no well entrance, e.g. landing door is opened.

The well access operation mode may be activated from a main control panel positioned in connection with a hoisting machinery and/or from a landing control panel positioned at a landing and/or from a car control panel positioned within the car 10.

The activation of the well access mode may be done by entering a predetermined pin code into the respective control panel.

The well lighting 60 may be activated when the well access operation mode is activated and the well lighting 60 may be deactivated when the well access operation mode is deactivated.

The well lighting 60 may further be activated in a situation in which the control system fails or the control system is powered off.

The well lighting 60 may further be activated in a situation in which a rescue drive (RDF) mode of the elevator is activated. The car 10 is in the rescue drive mode driven manually by pushing a drive bottom on a corresponding user interface. The car 10 is in this rescue drive mode driven with a low speed to the next landing under or above the position in which the car 10 has been stuck. The well lighting 60 may be deactivated when the rescue drive mode is deactivated.

The well lighting 60 may also be activated from within the well 20. The well lighting 60 may be activated in a situation in which any safety switch on the car roof (except for the car door contact) and/or any safety switch in the well pit 22 is triggered and/or a manual command from a service technician user interface (Mini Console) is received by the controller 100. The Mini Console is a portable console carried by the service technician, whereby said Mini Console can be connected to an interface connecting the Mini Console to the controller 100 of the elevator. The well lighting 60 may be deactivated as a counter operation in all the situations in which the well lighting 60 is activated from within the well 20.

The car 10 may comprise a first movable well lighting in the form of a top of car well lighting 62. The top of car well lighting 62 may be activated and deactivated at the same time the stationary well lighting 61 is activated and deactivated.

The car 10 may comprise a second movable well lighting in the form of a bottom of car well lighting 63. The bottom of car well lighting 63 may be activated and deactivated at the same time the stationary well lighting 61 is activated and deactivated.

The activation and deactivation times of the well lighting 60 i.e. the stationary well lighting 61 and/or the movable well lighting 62, 63 mounted on the car 10 may be communicated from the controller 100 to a service centre. The controller 100 or the service centre may calculate how long the well lighting 60 has been active in order to estimate the time at which the lamps in the well lighting should to be replaced with new lamps. The controller 100 may include a real time clock which is counting even when power is off. The assumption is that the well lighting 60 is active when the power to the controller 100 of the elevator is off.

The first embodiment requires only one relay K1 in the controller 100 area and only one relay K2 in the sub-controller 110 area. The equipment used in a prior art well lighting control i.e. the switch in the well pit, the impulse relay in the controller area and the long wire from the controller 100 to the well pit 22 may thus be eliminated.

The second embodiment may be realized in an analogues way with relays or with a transistor steering as shown in FIG. 3. A signal cable would pass from the controller 100 to the LED lamps in the well lighting 60.

All the different criteria mentioned in this application based on which the well lighting 60 may be activated or deactivated, may be used as alternatives. This means that only one of said alternatives is used at a time in an elevator. It is, however, also possible to use several of the alternatives at a time in an elevator, whereby each of the alternatives will separately activate or deactivate the well lighting.

It will be obvious to a person skilled in the art that, as the technology advances, the inventive concept can be implemented in various ways. The invention and its embodiments are not limited to the examples described above but may vary within the scope of the claims.

The invention claimed is:

1. A method for controlling an elevator lighting, the elevator comprising a car moving upwards and downwards in a well, a controller controlling the elevator, and a well lighting, the well lighting including a first movable well lighting in the form of a top of car well lighting mounted on a top of the car and a second movable well lighting in the form of a bottom of car well lighting mounted at a bottom of the car, the method comprising:

detecting a manual unlocking or a manual opening of a landing door, activating the well lighting automatically when the controller detects a manual unlocking of a landing door or a manual opening of a landing door so that the surrounding of the car is illuminated when a service technician enters the well making it possible for the service technician to locate the position of the car in the well in a safe way.

2. The method according to claim 1, whereby said manual unlocking of the landing door is done by turning a service key in a service key nest on a landing, which turning of the service key is detected by the controller.

3. The method according to claim 1, whereby said manual opening of a landing door is detected based on a switching device connected to the landing door so that opening of the landing door opens the switching device which is detected by the controller.

4. The method according to claim 1, further comprising deactivating the well lighting automatically at the end of a predetermined time period after the controller has determined that the elevator has returned to normal operation.

5. The method according to claim 1, whereby the well lighting comprises a stationary well lighting mounted on at least one wall in the shaft.

6. An elevator comprising a car moving upwards and downwards in a well, a controller controlling the elevator, and a well lighting being supplied with electric power from a power supply for well lighting, the well lighting being controlled by the controller, the well lighting including a first movable well lighting in the form of a top of car well lighting mounted on a top of the car and a second movable well lighting in the form of a bottom of car well lighting mounted at a bottom of the car, whereby a manual unlocking or a manual opening of a landing door is detected by the controller, the well lighting is activated automatically by the controller when the controller detects a manual unlocking or a manual opening of a landing door so that the surrounding of the car is illuminated when a service technician enters the well making it possible for the service technician to locate the position of the car in the well in a safe way.

7. An elevator according to claim 6, whereby the controller activates the well lighting by controlling a relay being connected between the power supply for well lighting and the well lighting.

8. An elevator according to claim 6, whereby the controller activates the well lighting by controlling an electronic switching component being connected between the power supply for well lighting and the well lighting.

9. An elevator according to claim 8, whereby the electronic switching component is a transistor.

10. An elevator according to claim 6, whereby the well lighting is deactivated automatically by the controller at the end of a predetermined time period after the controller has determined that the elevator has returned to normal operation.

11. An elevator according to claim 6, whereby the well lighting comprises a stationary well lighting positioned at least on one wall in the well.

12. An elevator according to claim 6, whereby the well lighting comprises a first movable well lighting in the form of a top of car well lighting mounted on a top of the car.

13. An elevator according to claim 6, whereby the well lighting comprises a second movable well lighting in the form of a bottom of car well lighting mounted at a bottom of the car.

14. The method according to claim 2, whereby said manual opening of a landing door is detected based on a switching device connected to the landing door so that opening of the landing door opens the switching device which is detected by the controller.

15. The method according to claim 2, further comprising deactivating the well lighting automatically at the end of a predetermined time period after the controller has determined that the elevator has returned to normal operation.

16. The method according to claim 3, further comprising deactivating the well lighting automatically at the end of a predetermined time period after the controller has determined that the elevator has returned to normal operation.

17. The method according to claim 2, whereby the well lighting comprises a stationary well lighting mounted on at least one wall in the shaft.

18. The method according to claim 3, whereby the well lighting comprises a stationary well lighting mounted on at least one wall in the shaft.

* * * * *